United States Patent
Lee

(10) Patent No.: US 12,344,213 B2
(45) Date of Patent: Jul. 1, 2025

(54) BRAKE PRESSURE SENSOR

(71) Applicant: HYUNDAI MOBIS Co., Ltd., Seoul (KR)

(72) Inventor: Dong Geun Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 493 days.

(21) Appl. No.: 17/885,924

(22) Filed: Aug. 11, 2022

(65) Prior Publication Data

US 2023/0051348 A1    Feb. 16, 2023

(30) Foreign Application Priority Data

Aug. 11, 2021 (KR) .................. 10-2021-0106073

(51) Int. Cl.
*B60T 17/22* (2006.01)
*G01L 19/06* (2006.01)
*G01L 19/14* (2006.01)

(52) U.S. Cl.
CPC .............. *B60T 17/22* (2013.01); *G01L 19/14* (2013.01); *B60T 2270/88* (2013.01)

(58) Field of Classification Search
CPC ...... B60T 17/22; B60T 2270/88; G01L 19/00; G01L 19/06; G01L 19/14
See application file for complete search history.

(56) References Cited

U.S. PATENT DOCUMENTS 4,714,300 A * 12/1987 Heess .................. B60T 8/4863
  303/61
2009/0140572 A1 * 6/2009 Kim .................... G01L 19/0084
  303/17

FOREIGN PATENT DOCUMENTS

| JP | 2008170059 A | 7/2008 |
| KR | 10-2003-0024951 A | 3/2003 |
| KR | 10-0609026 B1 | 8/2006 |

OTHER PUBLICATIONS

Office Action issued on Mar. 6, 2025 in the corresponding Chinese Patent Application No. 202210709245.6.

* cited by examiner

*Primary Examiner* — Nguyen Q. Ha
(74) *Attorney, Agent, or Firm* — Morgan, Lewis & Bockius LLP

(57) ABSTRACT

A brake pressure sensor may include: a housing part; an induction part mounted in a first end portion of the housing part, and configured to guide oil; an adjusting part embedded in the housing part, and configured to guide oil, and adjust an amount of oil passing therethrough, as a spacing between the adjusting part and the induction part is varied while the adjusting part is moved according to hydraulic pressure; a support part mounted in a second end portion of the housing part, and configured to support the adjusting part and guide the oil having passed through the adjusting part; and a measurement part connected to the support part, and configured to measure the pressure of the oil having passed through the support part.

10 Claims, 6 Drawing Sheets

BRAKE PRESSURE SENSOR

CROSS-REFERENCE TO RELATED APPLICATION

This application claims priority from and the benefit of Korean Patent Application No. 10-2021-0106073, filed on Aug. 11, 2021, which is hereby incorporated by reference for all purposes as if set forth herein.

BACKGROUND

Field

Exemplary embodiments of the present disclosure relate to a brake pressure sensor, and more particularly, to a brake pressure sensor which can raise precision in a middle/low pressure region, and induce stiffness not to exceed the stiffness limit due to a change in output value in a high pressure region.

Discussion of the Background

In general, a vehicle includes a brake system for decelerating or braking the vehicle. The brake system includes a pedal that transfers a user's operation force, a booster and a master cylinder that are connected to the pedal to form brake hydraulic pressure, and a wheel brake that brakes a wheel of the vehicle according to the brake hydraulic pressure inputted from the booster and the master cylinder.

Such a brake system generates a brake force when a driver steps on the brake pedal. At this time, when the brake pressure is larger than that in a road condition or a frictional force of the wheel brake, generated by the brake pressure, is larger than a brake force generated from a tire or road surface, a slip occurs while the tire slips the road surface.

In such a state that the brake is operated, a steering device is locked so that the vehicle cannot be steered in a desired direction.

Therefore, according to the related art, an ABS (Anti-lock Brake System) has been developed, which electronically controls a pedal force of the brake in order to enable steering when a slip occurs.

The ABS includes a hydraulic unit and an ECU (Electronic Control Unit). The hydraulic unit includes a low pressure accumulator, a high pressure accumulator, and a plurality of solenoid valves for adjusting the brake pressure transferred to the wheel brake, and the ECU serves to control components which are electrically operated.

Furthermore, the hydraulic unit includes a pressure sensor that senses brake operating pressure generated by the master cylinder in proportion to a brake pedal force, and transfers the sensed brake operating pressure as an electrical signal to the ECU. The ECU controls the operation of the brake according to the electrical signal transferred from the pressure sensor.

More specifically, the pressure sensor is mounted in a processing hole formed at a leading end of the master cylinder, and electrically connected to a circuit board of the ECU through a separate connector and cable. Such a pressure sensor transmits an output signal having a magnitude proportional to measured pressure.

The pressure sensor requires stiffness for a measurement range higher than an output value with high precision under a service condition in which a large brake force and sudden braking related to a high pressure region are required. However, when wide regions are evenly set due to a limited output resource, a pressure variation per output signal is so large that the precision is degraded.

Furthermore, a low pressure region-related braking region is used in a middle/low pressure region, and an autonomous vehicle requires low pressure precise control and thus requires a pressure variation per small signal.

That is, the conventional pressure sensor has difficulties in satisfying requirements for brake control, which are conflicting with each other in the high pressure region and the low pressure region, at the same time. Thus, there is a demand for a device capable of solving such a problem.

The related art of the present disclosure is disclosed in Korean Patent No. 10-0609026 registered on Jul. 27, 2006 and entitled "Brake Oil Pressure Control System with Pressure Sensor."

SUMMARY

Various embodiments are directed to a brake pressure sensor which can raise precision in a middle/low pressure region, and induce stiffness not to exceed the stiffness limit due to a change in output value in a high pressure region.

In an embodiment, a brake pressure sensor may include: a housing part; an induction part mounted in a first end portion of the housing part, and configured to guide oil; an adjusting part embedded in the housing part, and configured to guide oil, and adjust an amount of oil passing therethrough, as a spacing between the adjusting part and the induction part is varied while the adjusting part is moved according to hydraulic pressure; a support part mounted in a second end portion of the housing part, and configured to support the adjusting part and guide the oil having passed through the adjusting part; and a measurement part connected to the support part, and configured to measure the pressure of the oil having passed through the support part.

The housing part may include: a first housing part into which the induction part is inserted; a second housing part protruding from an inner surface of the first housing part, and configured to support the induction part; a third housing part protruding from an inner surface of the second housing part, and configured to support the adjusting part; and a fourth housing part extended from an end portion of the first housing part, having an inner diameter larger than that of the first housing part, and having the support part mounted therein.

The induction part may include: an induction body inserted into the housing part; one or more induction fixers extended from the induction body, and brought into contact with the inner circumferential surface of the housing part; and an induction ball disposed in the induction body, and having a spherical shape to induce oil having passed through the one or more induction fixers.

The adjusting part may include: a first adjusting part supported by the housing part, and configured to guide oil to an inside of the first adjusting part and adjust the amount of oil guided by the spacing from the induction part; a second adjusting part extended from the first adjusting part, configured to guide oil to an inside of the second adjusting part, and supported by the support part; a third adjusting part protruding from an outer surface of the second adjusting part; and a fourth adjusting part disposed between the third adjusting part and the housing part, and configured to elastically support the third adjusting part.

When a first operating force applied to the first adjusting part is represented by F1, a spring force of the fourth adjusting part is represented by F3, and a second operating force applied to the second adjusting part is represented by F2, a relation of F1+F3=F2 may be established.

A nodal point may be changed according to an input part area of the first adjusting part, an output part area of the second adjusting part or a spring constant of the fourth adjusting part.

The support part may include: a first support part embedded in the housing part; a second support part protruding inwardly from the first support part, and configured to support an outer portion of the adjusting part; a third support part extended from the second support part, and configured to support an end portion of the adjusting part; a fourth support part extended from the third support part, and coupled to the second end portion of the housing part; and a fifth support part configured to connect the fourth support part and the measurement part, and configured to guide oil.

The second support part may have a sealing part disposed thereon and configured to block oil leakage.

The first support part, the second support part, the third support part, the fourth support part, and the fifth support part may be one integrated body.

The first support part, the second support part, the third support part, and the fourth support part may be one integrated body, and the fifth support part may be a separate part.

In the brake pressure sensor in accordance with the embodiment of the present disclosure, the flow rate may be adjusted as the adjusting part embedded in the housing part is moved by the forces applied to the input part and the output part, which makes it possible to improve the measurement accuracy at the middle/low pressure, and to stably measure the maximum required brake pressure.

DETAILED DESCRIPTION OF THE ILLUSTRATED EMBODIMENTS

Hereinafter, a brake pressure sensor will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
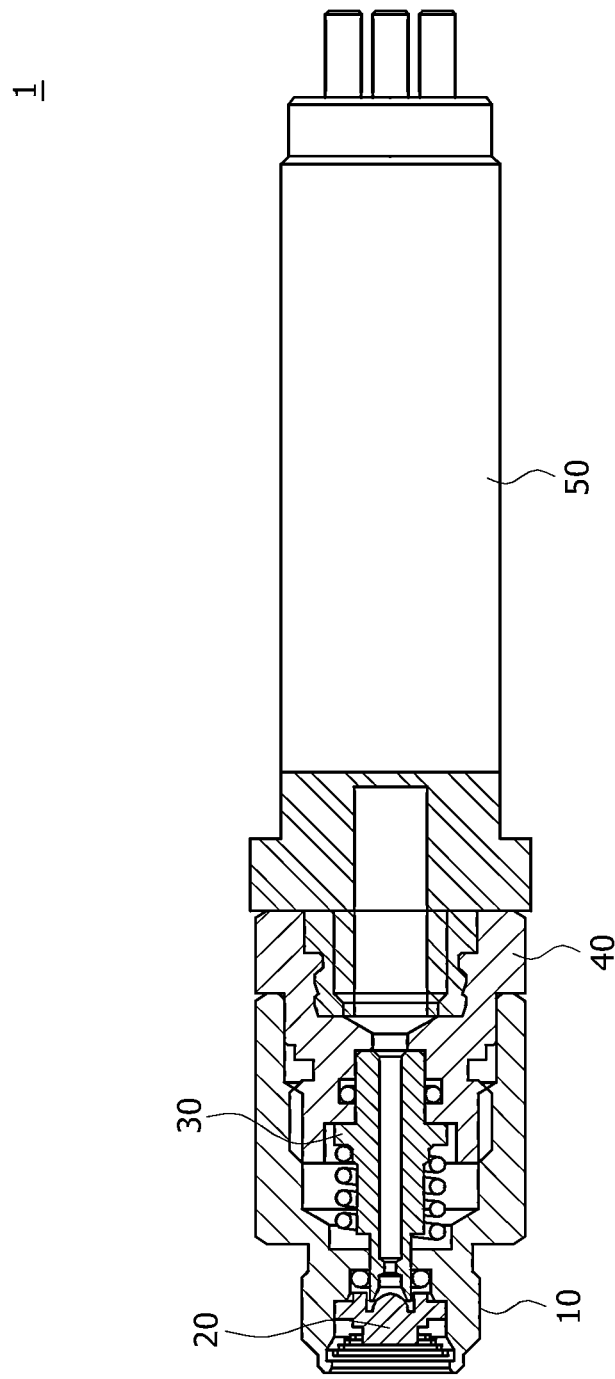
FIG. 1 is a diagram schematically illustrating a brake pressure sensor in accordance with an embodiment of the present disclosure.

FIG. 1 is a diagram schematically illustrating a brake pressure sensor 1 in accordance with an embodiment of the present disclosure. Referring to FIG. 1, the brake pressure sensor 1 in accordance with the embodiment of the present disclosure includes a housing part 10, an induction part 20, an adjusting part 30, a support part 40, and a measurement part 50. Such components may be assembled through various methods such as interference fitting, bolting, screwing, and welding.

The housing part 10 may be connected to a master cylinder, and guide oil to measure hydraulic pressure of the master cylinder. The housing part 10 may be directly connected to various targets whose hydraulic pressures need to be measured, and have a shape for guiding oil stored in the targets.

The induction part 20 is mounted at one end portion of the housing part 10, and serves to guide oil. For example, the induction part 20 may be disposed at the entrance of the housing part 10, into which oil is introduced. The induction part 20 may guide the oil introduced into the housing part 10, and adjust the amount of the oil according to the spacing from the adjusting part 30.

The adjusting part 30 may be embedded in the housing part 10, and serve to guide oil. While the adjusting part 30 is moved according to hydraulic pressure, the spacing between the adjusting part 30 and the induction part 20 may be varied to adjust the amount of oil passing through the adjusting part 30. For example, the spacing between the induction part 20 and the adjusting part 30 may be adjusted by the force of oil, applied to an input part of the adjusting part 30, the force of oil, applied to an output part of the adjusting part 30, and a spring force to elastically support the adjusting part 30. The oil may be moved through the adjusting part 30.

The support part 40 is mounted at the other end portion of the housing part 10, and serves to support the adjusting part 30 and guide the oil having passed through the adjusting part 30.

The measurement part 50 connected to the support part 40 serves to measure the pressure of the oil having passed through the support part 40.

Figure 2:
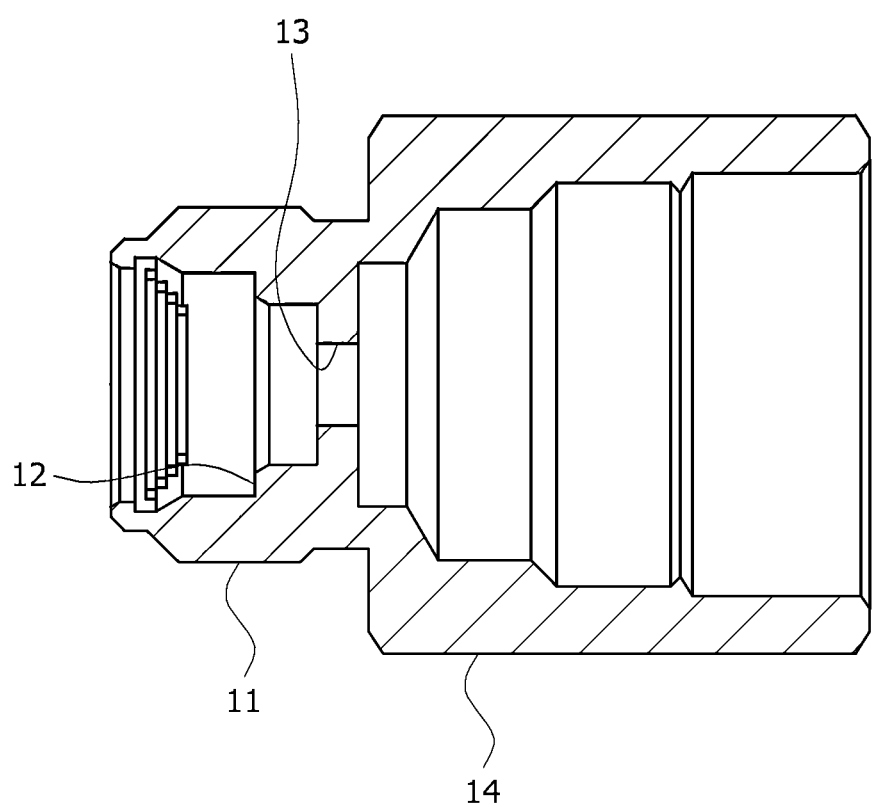
FIG. 2 is a diagram schematically illustrating a housing part in accordance with the embodiment of the present disclosure.

FIG. 2 is a diagram schematically illustrating the housing part in accordance with the embodiment of the present disclosure. Referring to FIG. 2, the housing part 10 in accordance with the embodiment of the present disclosure includes a first housing part 11, a second housing part 12, a third housing part 13, and a fourth housing part 14.

The induction part 20 is inserted into the first housing part 11. For example, the first housing part 11 may have an end portion connected to the master cylinder, and the inside of the first housing part 11 may have a pipe shape to guide oil therethrough.

The second housing part 12 protrudes from the inside of the first housing part 11, and serves to support the induction part 20. For example, the induction part 20 inserted into the first housing part 11 may be locked to the second housing part 12, such that the insertion position thereof is fixed.

The third housing part 13 protrudes from the inside of the first housing part 11, and servers to support the adjusting part 30. For example, the second housing part 12 and the third housing part 13 may be sequentially disposed between one end portion of the first housing part 11, into which oil is introduced at the initial stage, and the other end portion of the first housing part 11. The third housing part 13 may be formed to surround the outer circumferential surface of the adjusting part 30, such that oil can pass only through the inside of the adjusting part 30.

The fourth housing part 14 is extended from an end portion of the first housing part 11, and has a larger inner diameter than the first housing part 11, and the support part 40 is mounted in the fourth housing part 14. For example, the fourth housing part 14 may be designed to have larger inner and outer diameters than the first housing part 11.

Figure 3:
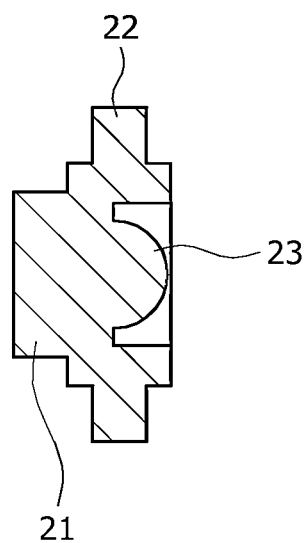
FIG. 3 is a diagram schematically illustrating an induction part in accordance with the embodiment of the present disclosure.

FIG. 3 is a diagram schematically illustrating the induction part in accordance with the embodiment of the present disclosure. Referring to FIG. 3, the induction part 20 in accordance with the embodiment of the present disclosure includes an induction body 21, an induction fixer 22, and an induction ball 23.

The induction body 21 is inserted into the housing part 10. For example, the induction body 21 may be inserted into the first housing part 11, and supported by the master cylinder.

One or more induction fixers 22 are extended from the induction body 21, and brought into close contact with the inner circumferential surface of the housing part 10. For example, a plurality of induction fixers 22 may be disposed along the circumference of the induction body 21 so as to be spaced apart from each other, and locked to the second housing part 12 so as to restrict the induction body 21 from moving in one direction. Oil may pass between the induction fixers 22. An O-ring may be disposed in the space between the induction fixer 22 and the third housing part 13, and serve to block oil leakage. The induction fixers 22 may be screwed to or press-fitted into the first housing part 11. In addition, the state in which the induction fixers 22 are mounted in the first housing part 11 may be maintained through various other methods.

The induction ball 23 is formed in the induction body 21, and serves to induce the oil having passed through the induction fixer 22. Such an induction ball 23 has a spherical shape. For example, one surface of the induction body 21 may face the master cylinder, and the induction ball 23 may be formed on the other surface of the induction body 21. The induction ball 23 may be formed in the central portion of the induction body 21, and the induction fixers 22 may be disposed around the induction ball 23.

Figure 4:
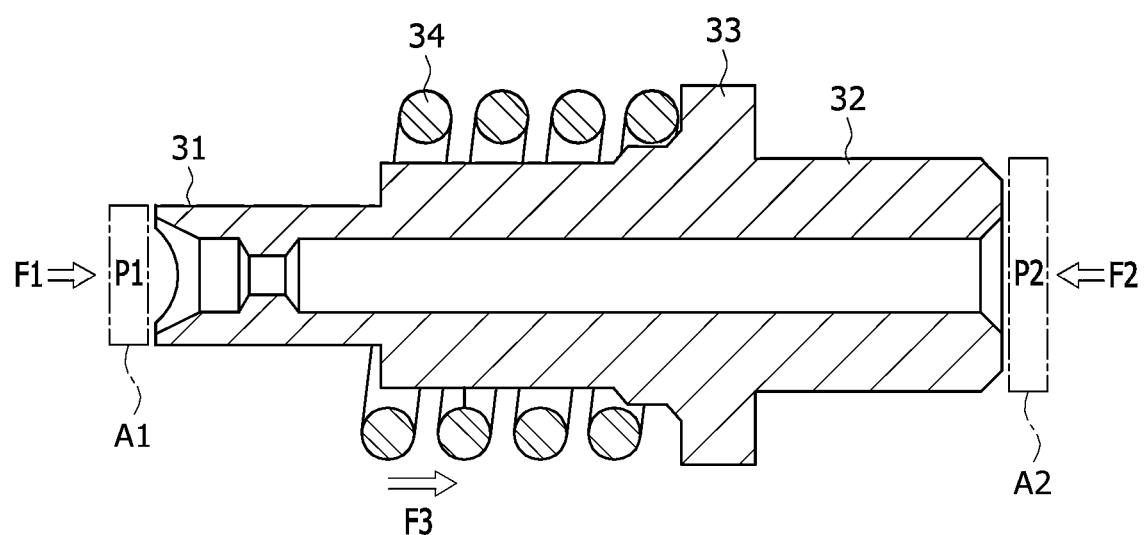
FIG. 4 is a diagram schematically illustrating an adjusting part in accordance with the embodiment of the present disclosure.
Figure 5:
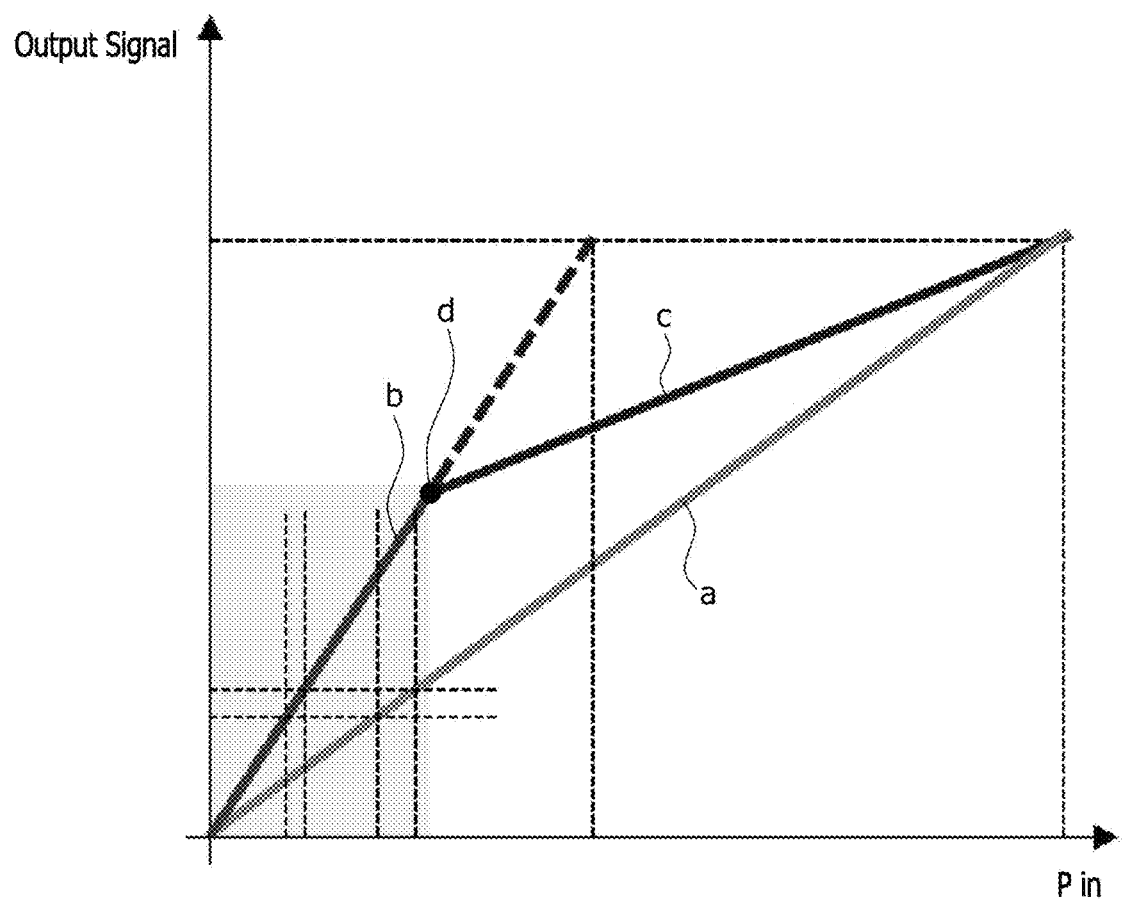
FIG. 5 is a graph schematically illustrating an output signal of the brake pressure sensor in accordance with the embodiment of the present disclosure.

FIG. 4 is a diagram schematically illustrating the adjusting part in accordance with the embodiment of the present disclosure, and FIG. 5 is a graph schematically illustrating an output signal of the brake pressure sensor in accordance with the embodiment of the present disclosure. Referring to FIGS. 4 and 5, the adjusting part 30 in accordance with the embodiment of the present disclosure includes a first adjusting part 31, a second adjusting part 32, a third adjusting part 33, and a fourth adjusting part 34.

The first adjusting part 31 is supported by the housing part 10, and serves to guide oil to the inside thereof, and adjust the amount of the guided oil through the spacing from the induction part 20. For example, the first adjusting part 31 may have a pipe shape to guide oil, penetrate the third housing part 13, and have an end portion formed to cover the induction ball 23. Through the space between the first adjusting part 31 and the induction ball 23, oil may be moved into the first adjusting part 31. When the first adjusting part 31 is moved and brought into close contact with the induction ball 23, the movement of oil to the first adjusting part 31 may be blocked.

The second adjusting part 32 is extended from the first adjusting part 31, serves to guide oil to the inside thereof, and is supported by the support part 40. For example, the second adjusting part 32 may be designed to have the same inner diameter as the first adjusting part 31, and have a larger outer diameter than the first adjusting part 31.

The third adjusting part 33 protrudes from the outside of the second adjusting part 32. For example, the third adjusting part 33 may be disposed in the circumferential direction of the second adjusting part 32, and locked to the support part 40 and restricted from moving toward the measurement part 50.

The fourth adjusting part 34 is disposed between the third adjusting part 33 and the housing part 10, and serves to elastically support the third adjusting part 33. For example, the fourth adjusting part 34 may be formed in the shape of a coil spring wound around the second adjusting part 32. The fourth adjusting part 34 may have one end portion supported by the third housing part 13, and the other end portion supported by the third adjusting part 33.

When a first operating force applied to the first adjusting part 31 is represented by F1, a spring force of the fourth adjusting part 34 is represented by F3, and a second operating force applied to the second adjusting part 32 is represented by F2, a relation of $F1+F3=F2$ may be established.

In this case, the first operating force F1 may indicate a force applied to the first adjusting part 31 by hydraulic pressure introduced through the first adjusting part 31, and may be decided by first hydraulic pressure P1 inputted from the first adjusting part 31 and an input part area A1 of the first adjusting part 31.

The second operating force F2 may indicate a force applied to the second adjusting part 32 by hydraulic pressure discharged through the second adjusting part 32, and may be decided by second hydraulic pressure P2 discharged from the second adjusting part 32 and an output part area A2 of the second adjusting part 32.

According to the input part area A1 of the first adjusting part 31, the output part area A2 of the second adjusting part 32 or a spring constant, a nodal point can be changed. Depending on design, the input part area A1 may be adjusted to improve output resolution in a middle/low pressure region. Depending on design, the output part area A2 may be adjusted to improve output resolution in a middle/low pressure region. Depending on design, the spring constant may be adjusted to improve output resolution in a middle/low pressure region. Depending on design, the input part area A1 and the output part area A2 may be adjusted to improve output resolution in a middle/low pressure region. Depending on design, the input part area A1 and the spring constant may be adjusted to improve output resolution in a middle/low pressure region. Depending on design, the output part area A2 and the spring constant may be adjusted to improve output resolution in a middle/low pressure region. Depending on design, the input part area A1, the output part area A2, and the spring constant may be adjusted to improve output resolution in a middle/low pressure region.

That is, the graph of FIG. 5 shows that, in the middle/low pressure region, a middle/low pressure line (b) has a larger slope than a general brake output line (a). Thus, an output signal change is larger than an input value per unit signal, which makes it possible to perform more precise measurement.

In a high pressure region following a nodal point (d), the slope of a high pressure line (c) is smaller than the slope of the general brake output line (a). That is, as the flow rate is adjusted by the adjusting part 30, the measurement part 50 may stably measure the maximum required brake pressure.

Figure 6:
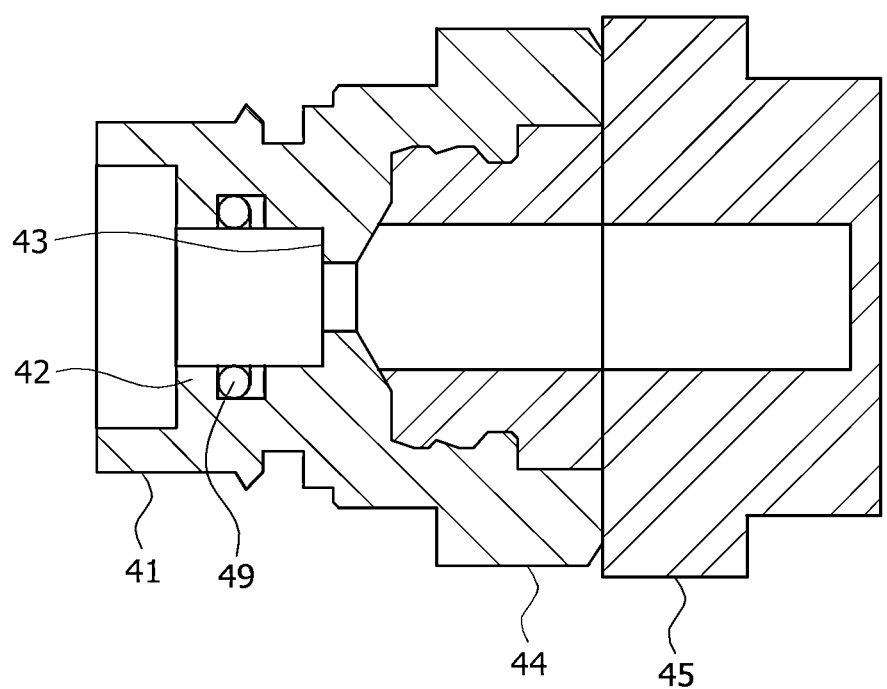
FIG. 6 is a diagram schematically illustrating a support part in accordance with the embodiment of the present disclosure.

FIG. 6 is a diagram schematically illustrating the support part in accordance with the embodiment of the present disclosure. Referring to FIG. 6, the support part 40 in accordance with the embodiment of the present disclosure includes a first support part 41, a second support part 42, a third support part 43, a fourth support part 44, and a fifth support part 45.

The first support part 41 is embedded in the housing part 10. For example, the first support part 41 may be inserted into the fourth housing part 14, and brought into close contact with the inner circumferential surface of the fourth housing part 14. The first support part 41 may be designed to have a larger inner circumferential surface than the outer diameter of the second adjusting part 32, such that an operation space is formed therebetween.

The second support part 42 protrudes inward from the first support part 41, and serves to support the outside of the adjusting part 30. For example, the second support part 42 may be disposed on a movement path of the third adjusting part 33, and restrict the third adjusting part 33 from moving in one direction.

The third support part 43 is extended from the first support part 41, and serves to support an end portion of the adjusting part 30. For example, the third support part 43 may be formed so as to surround the circumference of an end portion of the second adjusting part 32, and support the second adjusting part 32 which is moved. The third support part 43 and the second support part 42 may set the limit to the movement of the adjusting part 30 in one direction. A sealing part 49 disposed on the second support part 42 may be brought into close contact with the outer circumferential surface of the second adjusting part 32, and thus block oil leakage.

The fourth support part 44 is extended from the third support part 43, and coupled to an end portion of the housing part 10. For example, the fourth support part 44 may be screwed to the inner circumferential surface of the fourth housing part 14, and locked to an end portion of the fourth housing part 14 such that an insertion depth thereof is limited.

The fifth support part 45 serves to connect the fourth support part 44 and the measurement part 50, and guide oil. For example, the fifth support part 45 may have a shape through which oil can be moved.

The first support part 41, the second support part 42, the third support part 43, and the fourth support part 44 may be formed as one body. The fifth support part 45 may be formed as one body with the fourth support part 44 or manufactured as a separate part from the fourth support part 44. For example, when the first to fourth support parts 41 to 45 are formed as one body, the support part 40 may serve as a medium to connect the housing part 10 and the measurement part 50. When the fifth support part 45 is manufactured as a separate part, the fifth support part 45 may serve as a medium to connect the fourth support part 44 and the measurement part 50.

Hereafter, an assembling process and an operation of the brake pressure sensor in accordance with the embodiment of the present disclosure, which has the above-described structure, will be described as follows.

The induction part 20 is mounted in an end portion of the housing part 10, and the adjusting part 30 supported by the inside of the housing part 10 is connected to the measurement part 50 through the support part 40. In this case, the end portion of the housing part 10 is connected to the master cylinder.

In the above-described state, oil of the master cylinder is introduced into the housing part 10, and passes through the adjusting part 30 and the support part 40 via the space between the induction part 20 and the adjusting part 30, and the measurement part 50 measures hydraulic pressure.

The adjusting part 30 includes the first adjusting part 31, the second adjusting part 32 extended from the first adjusting part 31, the third adjusting part 33 protruding from the outside of the second adjusting part 32, and the fourth adjusting part 34 that elastically supports the third adjusting part 33.

According to the input part area A1 and the output part area A2 of the adjusting part 30 and the spring force of the fourth adjusting part 34, a nodal point can be changed.

At middle/low pressure, the flow rate adjustment by the adjusting part 30 is not performed, which makes it possible to improve the output resolution.

At high pressure, a stronger force may be applied from the output part of the adjusting part 30 such that the fourth adjusting part 34 is contracted, and the first adjusting part 31 may be close to the induction part 20 so as to adjust the flow rate. Thus, the measurement part 50 may stably measure the maximum required brake pressure.

In the brake pressure sensor 1 in accordance with the embodiment of the present disclosure, the flow rate may be adjusted as the adjusting part 30 embedded in the housing part 10 is moved by the forces applied to the input part and the output part, which makes it possible to improve the measurement accuracy at the middle/low pressure, and to stably measure the maximum required brake pressure.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake pressure sensor comprising:
    a housing part;
    an induction part mounted in a first end portion of the housing part, and configured to guide oil;
    an adjusting part embedded in the housing part, and configured to guide oil and adjust an amount of oil passing therethrough, as a spacing between the adjusting part and the induction part is varied while the adjusting part is moved according to hydraulic pressure;
    a support part mounted in a second end portion of the housing part, and configured to support the adjusting part and guide the oil having passed through the adjusting part; and
    a measurement part connected to the support part, and configured to measure the pressure of the oil having passed through the support part.

2. The brake pressure sensor of claim 1, wherein the housing part comprises:
    a first housing part into which the induction part is inserted;
    a second housing part protruding from an inner surface of the first housing part, and configured to support the induction part;
    a third housing part protruding from an inner surface of the second housing part, and configured to support the adjusting part; and
    a fourth housing part extended from an end portion of the first housing part, having an inner diameter larger than that of the first housing part, and having the support part mounted therein.

3. The brake pressure sensor of claim 1, wherein the induction part comprises:
    an induction body inserted into the housing part;

one or more induction fixers extended from the induction body, and brought into contact with the inner circumferential surface of the housing part; and an induction ball disposed in the induction body, and having a spherical shape to induce oil having passed through the one or more induction fixers.

4. The brake pressure sensor of claim 1, wherein the adjusting part comprises:

a first adjusting part supported by the housing part, and configured to guide oil to an inside of the first adjusting part and adjust the amount of oil guided by the spacing from the induction part;

a second adjusting part extended from the first adjusting part, configured to guide oil to an inside of the second adjusting part, and supported by the support part;

a third adjusting part protruding from an outer surface of the second adjusting part; and a fourth adjusting part disposed between the third adjusting part and the housing part, and configured to elastically support the third adjusting part.

5. The brake pressure sensor of claim 4, wherein when a first operating force applied to the first adjusting part is represented by F1, a spring force of the fourth adjusting part is represented by F3, and a second operating force applied to the second adjusting part is represented by F2, a relation of F1+F3=F2 is established.

6. The brake pressure sensor of claim 5, wherein a nodal point is changeable according to an input part area of the first adjusting part, an output part area of the second adjusting part or a spring constant of the fourth adjusting part.

7. The brake pressure sensor of claim 1, wherein the support part comprises:

a first support part embedded in the housing part;

a second support part protruding inwardly from the first support part, and configured to support an outer portion of the adjusting part;

a third support part extended from the second support part, and configured to support an end portion of the adjusting part;

a fourth support part extended from the third support part, and coupled to the second end portion of the housing part; and a fifth support part configured to connect the fourth support part and the measurement part, and configured to guide oil.

8. The brake pressure sensor of claim 7, wherein the second support part has a sealing part disposed thereon and configured to block oil leakage.

9. The brake pressure sensor of claim 7, wherein the first support part, the second support part, the third support part, the fourth support part, and the fifth support part are one integrated body.

10. The brake pressure sensor of claim 7, wherein the first support part, the second support part, the third support part, and the fourth support part are one integrated body, and the fifth support part is a separate part.

* * * * *